United States Patent [19]

Gleim

[11] Patent Number: 5,371,448

[45] Date of Patent: Dec. 6, 1994

[54] MOTOR CONTROL CIRCUIT WITH CONTINUOUS PHASE CONTROL

[75] Inventor: Günter Gleim, Villingen, Germany

[73] Assignee: Deutsche Thomson-Brandt GmbH, Villengen-Schwenningen, Germany

[21] Appl. No.: 38,450

[22] Filed: Mar. 29, 1993

Related U.S. Application Data

[63] Continuation-in-part of Ser. No. 730,019, Jul. 12, 1991, Pat. No. 5,233,276, which is a continuation of Ser. No. 328,255, Feb. 23, 1989, abandoned.

[30] Foreign Application Priority Data

Jun. 30, 1987 [DE] Germany .............. 3721477

[51] Int. Cl.$^5$ .............................................. H02P 3/00
[52] U.S. Cl. .................................. 318/368; 318/105
[58] Field of Search ........ 318/368, 369, 457, 268–271, 318/273–274, 254, 439, 138, 105–110, 719, 775–778, 799–803, 74, 85, 280–286, 257, 261, 440, 442, 92, 375, 377, 759–760, 763; 388/843, 844, 911

[56] References Cited

U.S. PATENT DOCUMENTS

| | | | |
|---|---|---|---|
| 1,701,382 | 2/1929 | Macmillan | 318/740 |
| 1,900,594 | 3/1933 | Watson | 318/105 |
| 2,397,183 | 3/1946 | Kilgore et al. | |
| 2,422,906 | 6/1947 | Johnson | |
| 3,168,688 | 2/1965 | Roggenkamp | |
| 3,443,186 | 5/1969 | Martin | 318/257 |
| 3,562,612 | 2/1971 | Munson | 318/106 |
| 3,611,102 | 10/1971 | Leenhouts | 318/696 |
| 3,633,084 | 1/1972 | Rakes | 318/254 |
| 3,819,996 | 6/1974 | Habisohn | 318/224 |
| 3,820,063 | 6/1974 | Sexton et al. | 388/911 X |
| 4,072,883 | 2/1978 | Beiter | 318/257 |
| 4,103,281 | 7/1978 | Strom et al. | 388/911 X |
| 4,145,645 | 3/1979 | Price et al. | 318/762 |
| 4,224,558 | 9/1980 | Hays | 388/911 |
| 4,263,540 | 4/1981 | Brandt et al. | 318/775 |
| 4,278,925 | 7/1981 | Minakuchi | 388/911 |
| 4,349,772 | 9/1982 | Weiss | 318/799 |
| 4,438,381 | 3/1984 | Field, II | 318/696 |
| 4,525,658 | 6/1985 | Yanagida | |
| 4,564,795 | 1/1986 | Parkes et al. | 388/911 X |
| 4,599,545 | 7/1986 | Moriki et al. | 388/911 |
| 4,845,417 | 7/1989 | Ohkubo et al. | 318/696 |
| 4,879,492 | 11/1989 | Latassa et al. | |
| 4,879,498 | 11/1989 | Shinohara et al. | 318/254 |

FOREIGN PATENT DOCUMENTS

| | | |
|---|---|---|
| 2719200 | 11/1978 | Germany . |
| 54-115726 | 9/1979 | Japan . |
| 61-35183 | 2/1986 | Japan . |

*Primary Examiner*—Jonathan Wysocki
*Attorney, Agent, or Firm*—Joseph S. Tripoli; Joseph J. Laks; Harvey D. Fried

[57] ABSTRACT

A circuit arrangement for the triggering of motors includes a winding arrangement, the connections of which can be connected to electricity sources by means of a commutation facility. Several or several groups of electricity sources can be connected to the same connections at the same time to make rapid processes of acceleration and deceleration of the rotor of the motor possible. A rotary field causing deceleration can thereby be superimposed upon a rotary field causing acceleration without the necessity of interrupting a control loop for the electricity source generating the rotary field causing acceleration.

4 Claims, 1 Drawing Sheet

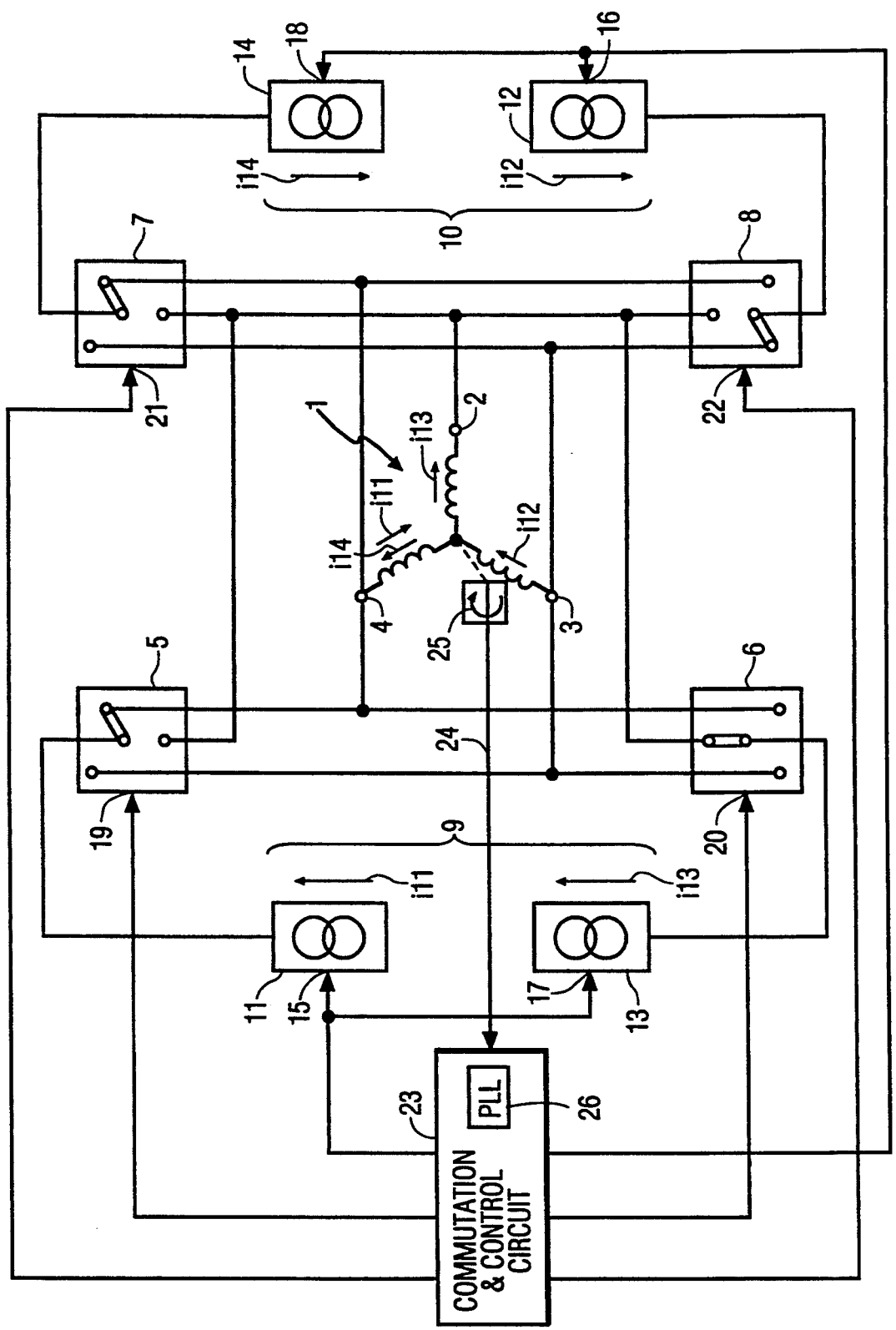

MOTOR CONTROL CIRCUIT WITH CONTINUOUS PHASE CONTROL

CROSS REFERENCE TO RELATED APPLICATIONS

This application is a continuation-in-part of copending U.S. application Ser. No. 07/730,019, filed Jul. 12, 1991, now U.S. Pat. No. 5,233,276 application Ser. No. 07/730,019 is a continuation of U.S. application Ser. No. 07/328,255 filed Feb. 23, 1989, and now abandoned.

BACKGROUND OF THE INVENTION

1. Field of the Invention

The invention is concerned with a circuit arrangement for the triggering of motors, for example those used in digital or analog tape recording devices.

2. Description of Art

In motors for precision drives in which, apart from the exact observation of given speed values, some relevance also lies in rapid speed changes and adoption of changed speed values, it is known to connect the inputs (influences) of the winding arrangement to electricity sources by means of a commutation facility in order to make the rotor follow a given alternating field and to monitor the speed by feedback. Due to the mass driven, the desired reaction of the rotor is not without inertia, but subject to a more or less strong delay.

If the rotor is to adopt a higher speed the delay can be minimized in that, by triggering accordingly, a high turning moment with positive direction is applied to the rotor which is maintained until it is recognized by the feedback that the desired speed is reached and then the triggering is reduced again to the stationary turning moment with positive direction which is necessary to maintain the speed. A modification of speed towards a smaller value can easily be achieved particularly in that the stationary triggering is switched off, then an opposite turning moment, i.e. in the negative direction, is generated and, after the lowered speed is reached, the stationary triggering is reestablished. It is a problem in this method that the speed reached after decay of the negatively directed turning moment is not always absolutely identical with the desired speed, thereby making an additional process of deceleration or acceleration necessary. In addition, the commutation sequence of the connections of the winding arrangement has to be synchronized again with the present rotation of the rotor.

Motor speed is controlled during generation of the accelerating field through a control circuit utilizing a tachometer generator and a phase locked loop (PLL) arrangement. However, changing speeds, e.g. from acceleration to deceleration, interrupts the phase locked loop and interferes with the ability of the phase locked loop to remain synchronized. It would therefore be desirable to maintain the phase control loop for the accelerating field in continuous operation even during generation of the decelerating field, when the turning moment in the negative direction is impressed. The problem here is, however, that the triggering facilities in their opposing effects on the rotor obstruct or even destroy each other and thus interrupt the phase locked loop.

SUMMARY OF THE INVENTION

The invention is concerned with the last named problem. Its object is to create a circuit arrangement for the triggering of motors which allows the phase locked loop to remain synchronized and enable a very precise and fast reacting modification of speed towards higher as well as towards lower speed values.

This problem is solved by a circuit arrangement for triggering a motor having a winding arrangement with a plurality of electrical connections, the circuit arrangement comprising: a plurality of electricity sources; and, a commutation facility for connecting more than one of the electricity sources, or more than one group of the electricity sources, to the same electrical connections at the same time. The electricity sources or the groups of electricity sources which can be connected with the same electrical connections at the same time can be controlled independently of one another. A first one or a first group of the electricity sources is used for acceleration of the motor and a second one or a second group of the electricity sources is used for deceleration of the motor. The groups of electricity sources comprise complementary, oppositely poled partial electrical sources which can be connected to different electrical connections at the same time. The first one or first group of the electricity sources used for acceleration is triggered at all times and the second one or second group of the electricity sources used for deceleration is triggered on demand. The complementary partial electricity sources can be controlled by a mirror current s circuit. A control circuit for the electricity sources, the mirror current circuit and the commutation facility receives information about motor speed and phase.

The measures according to the invention allow use of the same winding arrangement for acceleration and deceleration. Hereby, by the function of the sources effectuating the feed-in of energy into the winding arrangement as sources of electricity an undisturbed overlay of the fed-in currents is achieved so that the sources of energy do not destroy each other when they become effective simultaneously. Instead of a single electricity source, groups of electricity sources may also be used, whereby the number of electricity sources or partial electricity sources belonging to each group can be determined by the number of poles of the motor and, possibly, by whether unipolar or bipolar triggering is selected.

Preferably, the electricity sources are designed to be triggerable independent of each other. This way the speed-synchronous commutation can be maintained if a speed monitoring facility is present, e.g., by means of a tachometer generator and a phase locked loop circuit, whereby a modification of the speed of the motor is made by means of the other electricity source. When the other electricity source is switched off, the motor can then react and reach the original speed more quickly because it is not necessary to wait until, in case of a prior interruption, the speed-synchronous commutation is reestablished.

It is particularly advantageous to use the method according to the invention when the winding arrangement of the motor is triggered in a bipolar manner. This way by better utilization of the copper, a higher turning moment and, thereby a faster reaction to modification processes with the identical mass is achieved.

BRIEF DESCRIPTION OF THE DRAWING

A motor speed control circuit in accordance with this invention is shown in the sole FIGURE.

DETAILED DESCRIPTION OF THE PREFERRED EMBODIMENTS

The FIGURE shows as part of a circuit arrangement for the triggering of motors in a block schematic diagram, a number of electricity sources which can be connected via a commutation facility to connections of a winding arrangement of the motor. Hereby, a three-phase winding arrangement 1 is connected by connections 2, 3 and 4 via commutation facilities 5, 6, 7 and 8 to groups of electricity sources 9 and 10. The commutation facility comprises electronically controlled switches. The groups of electricity source 9 and 10 each consist of one partial electricity source 11 or 12 for positively directed currents and partial electricity sources 13 or 14 for negatively directed currents. Thus, this arrangement allows for bipolar triggering of the motor.

If one of both groups of electricity sources 9 or 10 is in operation the partial electricity sources 11 and 13 or respectively, 12 and 14 allocated to this group are always switched on at the same time. The groups of electricity sources 9 are used for acceleration whereas the groups of electricity sources 20 are used for deceleration. By means of the commutation circuits 5 and 7, the partial electricity sources 11 and 13 are connected each with those connections 2, 3, 4 of the winding arrangement 1 of the motor by which, under consideration of the position of the rotor to be driven, a rotary field causing acceleration can be generated. For deceleration, respectively, the same applies to the group of electricity sources 20 in which the partial electricity sources 12 and 14 can also also be connected to connections 2, 3, 4 of the winding arrangement 1 by means of the commutation circuit facilities 6 and 8. Hereby, the situation may arise that two electricity sources are connected to the same connection simultaneously, e.g. partial electricity source 22 and partial electricity source 14 to connection 4. Because the sources of energy are designed as electricity sources, however, only a simple interference (superposition) of the currents occurs without the electricity sources themselves being endangered. The commutation facilities 5, 6. 7 and 8 as well as the groups of electricity sources 9 and 10 are equipped with control inputs 15, 16, 17, 18, 19, 20, 21, 22 which are connected to a control circuit 23. The control circuit 23 is thereby phase supported as indicated by a feedback signal path 24. The rotary fields generated by the electricity sources 11, 12, 13, 14 in the winding arrangement 1 are absolutely matched in phase with the rotation movement of the motor during both acceleration and deceleration.

This way an overlay of the rotary fields is possible which can lead to acceleration or deceleration in the desired way without the necessity of interrupting a control loop formed by the tachometer generator 25 and the phase locked loop (PLL) 26. A phase out of the commutated triggering, in which the winding arrangement 1 is fed currents from group 9 of electricity sources 11, 13 used for acceleration as well as from group 10 of electricity sources 12, 14 used for deceleration, is illustrated in the FIGURE.

In this phase the partial electricity source 11 is connected with connection 4, the partial electricity source 13 with connection 2, the partial electricity source 14 with connection 4 and the partial electricity source 12 with connection 3. A current $-i_{13}$ is fed into the winding arrangement 1 via connection 2, a current $+i_{12}$ via connection 3 and a current $+i_{11} -i_{14}$ via connection 4. The subscripts indicate the relation to the electricity source supplying the current.

What is claimed is:

1. A motor control circuit, comprising:
   a winding arrangement having a plurality of connections for energizing a motor;
   sources of electricity for accelerating and decelerating said motor;
   a commutation facility for connecting said electricity sources to said winding arrangement to generate fields causing acceleration and deceleration of said motor;
   a tachometer for said motor; and,
   a phase control loop including said tachometer and a phase locked loop for synchronizing rotation of said motor and said accelerating field, said phase control loop and said motor remaining synchronized even when said motor changes from acceleration to deceleration during generation of said decelerating field.

2. A circuit according to claim 1, wherein said field for accelerating said motor is generated continuously and said field for decelerating said motor, when generated, is superimposed on said field for accelerating said motor.

3. A circuit according to claim 1, wherein only said field for decelerating said motor is generated on demand.

4. A circuit according to claim 1, wherein said field for accelerating said motor is generated continuously and said field for decelerating said motor is generated on demand.

* * * * *